United States Patent
Heikkinen et al.

(10) Patent No.: US 11,978,140 B2
(45) Date of Patent: May 7, 2024

(54) PERSONALIZED MEDIA OVERLAY RECOMMENDATION

(71) Applicant: Snap Inc., Santa Monica, CA (US)

(72) Inventors: Christie Marie Heikkinen, Santa Monica, CA (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/172,187

(22) Filed: Feb. 21, 2023

(65) Prior Publication Data
US 2023/0196646 A1 Jun. 22, 2023

Related U.S. Application Data

(63) Continuation of application No. 16/834,438, filed on Mar. 30, 2020, now Pat. No. 11,625,873.

(51) Int. Cl.
*G06T 11/60* (2006.01)
*G06F 3/04817* (2022.01)
(Continued)

(52) U.S. Cl.
CPC .......... *G06T 11/60* (2013.01); *G06F 3/04817* (2013.01); *G06F 3/04842* (2013.01); *G06F 3/04845* (2013.01); *G06T 11/40* (2013.01)

(58) Field of Classification Search
CPC ...... G06T 11/60; G06T 11/40; G06F 3/04817; G06F 3/04842; G06F 3/04845; G06F 3/04847
See application file for complete search history.

(56) References Cited

U.S. PATENT DOCUMENTS 5,754,939 A  5/1998  Herz et al.
5,880,731 A  3/1999  Liles et al.
(Continued)

FOREIGN PATENT DOCUMENTS

CA  2887596 A1  7/2015
CN  109863532 A  6/2019
(Continued)

OTHER PUBLICATIONS

"U.S. Appl. No. 15/803,681, Final Office Action dated Jul. 29, 2019", 14 pgs.
(Continued)

*Primary Examiner* — Chong Wu
(74) *Attorney, Agent, or Firm* — Schwegman Lundberg & Woessner, P.A.

(57) ABSTRACT

A method starts with a processor receiving, at a computing system from a client device, descriptive text data from a descriptive text interface displayed on the client device, the descriptive text data associated with a media content item displayed on the client device, analyzing the descriptive text data to identify at least one data characteristic within the descriptive text data, and accessing a plurality of personalized media overlay icons each comprising at least one media overlay icon characteristic. The processor determines whether the identified data characteristic is associated with any of the at least one media overlay icon characteristics of each of the plurality of personalized media overlay icons, generates a personalized overlay icon interface which includes a selection of the plurality of personalized media overlay icons that include at least one media content icon characteristic associated with the data characteristic. The processor also causes the personalized overlay icon interface to be overlaid on the media content item displayed on the client device below the descriptive text data interface.

20 Claims, 12 Drawing Sheets

(51) Int. Cl.
  *G06F 3/04842* (2022.01)
  *G06F 3/04845* (2022.01)
  *G06T 11/40* (2006.01)

(56) References Cited

U.S. PATENT DOCUMENTS

| | | |
|---|---|---|
| 6,023,270 A | 2/2000 | Brush et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,386,799 B1 | 6/2008 | Clanton et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,908,554 B1 | 3/2011 | Blattner |
| 7,912,896 B2 | 3/2011 | Wolovitz et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |

(56) References Cited

U.S. PATENT DOCUMENTS

| | | |
|---|---|---|
| 9,648,376 B2 | 5/2017 | Chang et al. |
| 9,652,809 B1 | 5/2017 | Levinson |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,049,477 B1 | 8/2018 | Kokemohr et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,325,416 B1 | 6/2019 | Scapel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,547,574 B2 | 1/2020 | Pham |
| 10,573,048 B2 | 2/2020 | Ni et al. |
| 10,657,701 B2 | 5/2020 | Osman et al. |
| 11,625,873 B2 * | 4/2023 | Heikkinen ............ G06T 11/40 345/629 |
| 11,818,286 B2 | 11/2023 | Heikkinen et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0030496 A1 | 2/2008 | Lee et al. |
| 2008/0055269 A1 | 3/2008 | Lemay et al. |
| 2008/0059570 A1 | 3/2008 | Bill |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-Amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0115776 A1 | 5/2009 | Bimbra et al. |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0146407 A1 | 6/2010 | Bokor et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0296324 A1 | 12/2011 | Goossens et al. |
| 2011/0320373 A1 | 12/2011 | Lee et al. |
| 2012/0011449 A1 | 1/2012 | Sasson et al. |
| 2012/0028659 A1 | 2/2012 | Whitney et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0282808 A1 | 10/2013 | Sadanandan et al. |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0082514 A1 | 3/2014 | Sivaraman et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0157153 A1 | 6/2014 | Yuen et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0379328 A1 | 12/2014 | Kim et al. |
| 2015/0067106 A1 | 3/2015 | Jaynes et al. |
| 2015/0100537 A1 | 4/2015 | Grieves et al. |
| 2015/0199082 A1 | 7/2015 | Scholler et al. |
| 2015/0206349 A1 | 7/2015 | Rosenthal et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |

(56) References Cited

U.S. PATENT DOCUMENTS

| | | |
|---|---|---|
| 2016/0134840 A1 | 5/2016 | Mcculloch |
| 2016/0180887 A1 | 6/2016 | Sehn |
| 2016/0234149 A1 | 8/2016 | Tsuda et al. |
| 2016/0253552 A1 | 9/2016 | Rihn et al. |
| 2016/0277419 A1 | 9/2016 | Allen et al. |
| 2016/0321708 A1 | 11/2016 | Sehn |
| 2016/0359777 A1 | 12/2016 | Tucker et al. |
| 2016/0359957 A1 | 12/2016 | Laliberte |
| 2016/0359987 A1 | 12/2016 | Laliberte |
| 2016/0361653 A1 | 12/2016 | Zhang et al. |
| 2017/0031550 A1 | 2/2017 | Shaffer |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0161382 A1 | 6/2017 | Ouimet et al. |
| 2017/0199855 A1 | 7/2017 | Fishbeck |
| 2017/0235848 A1 | 8/2017 | Van Dusen et al. |
| 2017/0263029 A1 | 9/2017 | Yan et al. |
| 2017/0286752 A1 | 10/2017 | Gusarov et al. |
| 2017/0287006 A1 | 10/2017 | Azmoodeh et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0344224 A1 | 11/2017 | Kay et al. |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0025219 A1 | 1/2018 | Baldwin et al. |
| 2018/0032212 A1 | 2/2018 | Choi et al. |
| 2018/0047200 A1 | 2/2018 | O'hara et al. |
| 2018/0083898 A1 | 3/2018 | Pham |
| 2018/0091732 A1 | 3/2018 | Wilson et al. |
| 2018/0107866 A1 | 4/2018 | Li et al. |
| 2018/0113587 A1 | 4/2018 | Allen et al. |
| 2018/0115503 A1 | 4/2018 | Baldwin et al. |
| 2018/0188916 A1 | 7/2018 | Lyons et al. |
| 2018/0191651 A1 | 7/2018 | Goldberg et al. |
| 2018/0300542 A1 | 10/2018 | Waddell et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0329622 A1 | 11/2018 | Missig et al. |
| 2018/0329960 A1 | 11/2018 | Liu et al. |
| 2019/0001223 A1 | 1/2019 | Blackstock et al. |
| 2019/0057616 A1 | 2/2019 | Cohen et al. |
| 2019/0098087 A1 | 3/2019 | Johnston et al. |
| 2019/0140990 A1 | 5/2019 | Rabbat et al. |
| 2019/0147112 A1 | 5/2019 | Gordon |
| 2019/0188920 A1 | 6/2019 | Mcphee et al. |
| 2020/0043145 A1 | 2/2020 | Cao et al. |
| 2020/0312008 A1 | 10/2020 | Cowburn et al. |
| 2020/0404065 A1 | 12/2020 | Schissel et al. |
| 2021/0271385 A1 | 9/2021 | Uy et al. |
| 2021/0304469 A1 | 9/2021 | Heikkinen et al. |
| 2021/0306451 A1 | 9/2021 | Heikkinen et al. |

FOREIGN PATENT DOCUMENTS

| | | |
|---|---|---|
| CN | 110168478 A | 8/2019 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 15/803,681, Final Office Action dated Nov. 4, 2020", 15 pgs.

"U.S. Appl. No. 15/803,681, Final Office Action dated Dec. 9, 2021", 16 pgs.

"U.S. Appl. No. 15/803,681, Non Final Office Action dated Apr. 4, 2019", 9 pgs.

"U.S. Appl. No. 15/803,681, Non Final Office Action dated Apr. 30, 2020", 13 pgs.

"U.S. Appl. No. 15/803,681, Non Final Office Action dated Jun. 14, 2021", 15 pgs.

"U.S. Appl. No. 15/803,681, Response filed Mar. 3, 2021 to Final Office Action dated Nov. 4, 2020", 11 pgs.

"U.S. Appl. No. 15/803,681, Response filed Jul. 3, 2019 to Non Final Office Action dated Apr. 4, 2019", 12 pgs.

"U.S. Appl. No. 15/803,681, Response filed Jul. 22, 2020 to Non Final Office Action dated Apr. 30, 2020", 10 pgs.

"U.S. Appl. No. 15/803,681, Response filed Sep. 14, 2021 to Non Final Office Action dated Jun. 14, 2021", 12 pgs.

"U.S. Appl. No. 15/803,681, Response filed Oct. 29, 2019 to Final Office Action dated Jul. 29, 2019", 14 pgs.

"U.S. Appl. No. 16/834,438, Final Office Action dated Aug. 3, 2022", 15 pgs.

"U.S. Appl. No. 16/834,438, Final Office Action dated Sep. 15, 2021", 11 pgs.

"U.S. Appl. No. 16/834,438, Non Final Office Action dated Jan. 4, 2022", 13 pgs.

"U.S. Appl. No. 16/834,438, Non Final Office Action dated Mar. 3, 2021", 7 pgs.

"U.S. Appl. No. 16/834,438, Notice of Allowance dated Nov. 30, 2022", 8 pgs.

"U.S. Appl. No. 16/834,438, Response filed May 4, 2022 to Non Final Office Action dated Jan. 4, 2022", 9 pgs.

"U.S. Appl. No. 16/834,438, Response filed Jun. 2, 2021 to Non Final Office Action dated Mar. 3, 2021", 8 pgs.

"U.S. Appl. No. 16/834,438, Response filed Nov. 3, 2022 to Final Office Action dated Aug. 3, 2022", 11 pgs.

"U.S. Appl. No. 16/834,438, Response filed Dec. 15, 2021 to Final Office Action dated Sep. 15, 2021", 8 pgs.

"U.S. Appl. No. 16/834,575, Examiner Interview Summary dated Mar. 3, 2022", 2 pgs.

"U.S. Appl. No. 16/834,575, Examiner Interview Summary dated Jul. 1, 2021", 2 pgs.

"U.S. Appl. No. 16/834,575, Final Office Action dated Mar. 16, 2022", 18 pgs.

"U.S. Appl. No. 16/834,575, Final Office Action dated Apr. 2, 2021", 16 pgs.

"U.S. Appl. No. 16/834,575, Non Final Office Action dated Oct. 14, 2022", 19 pgs.

"U.S. Appl. No. 16/834,575, Non Final Office Action dated Nov. 13, 2020", 15 pgs.

"U.S. Appl. No. 16/834,575, Non Final Office Action dated Nov. 26, 2021", 16 pgs.

"U.S. Appl. No. 16/834,575, Response filed Feb. 14, 2023 to Non Final Office Action dated Oct. 14, 2022", 13 pgs.

(56) References Cited

OTHER PUBLICATIONS

"U.S. Appl. No. 16/834,575, Response filed Feb. 28, 2022 to Non Final Office Action dated Nov. 26, 2021", 11 pgs.
"U.S. Appl. No. 16/834,575, Response filed Mar. 15, 2021 to Non Final Office Action dated Nov. 13, 2020", 9 pgs.
"U.S. Appl. No. 16/834,575, Response filed Jun. 16, 2022 to Final Office Action dated Mar. 16, 2022", 12 pgs.
"U.S. Appl. No. 16/834,575, Response filed Jul. 2, 2021 to Final Office Action dated Apr. 2, 2021", 9 pgs.
"Surprise!", [Online] Retrieved from the Internet: <URL: https://www.snap.com/en-us/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Castelluccia, Claude, et al., "EphPub: Toward robust Ephemeral Publishing", 19th IEEE International Conference on Network Protocols (ICNP), (Oct. 17, 2011), 18 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Fajman, "An Extensible Message Format for Message Disposition Notifications", Request for Comments: 2298, National Institutes of Health, (Mar. 1998), 28 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for IOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
U.S. Appl. No. 16/834,575, filed Mar. 30, 2020, Avatar Recommendation and Reply.
U.S. Appl. No. 16/834,438, filed Mar. 30, 2020, Personalized Media Overlay Recommendation.
U.S. Appl. No. 15/803,681, filed Nov. 3, 2017, Generating a Selectable Response to an Electronic Message.
"U.S. Appl. No. 16/834,575, 312 Amendment filed Sep. 28, 2023", 9 pgs.
"U.S. Appl. No. 16/834,575, Final Office Action dated Mar. 3, 2023", 21 pgs.
"U.S. Appl. No. 16/834,575, Notice of Allowance dated Jun. 28, 2023", 9 pgs.
"U.S. Appl. No. 16/834,575, PTO Response to Rule 312 Communication dated Oct. 11, 2023", 2 pgs.
"U.S. Appl. No. 16/834,575, Response filed Jun. 2, 2023 to Final Office Action dated Mar. 3, 2023", 15 pgs.

\* cited by examiner

US 11,978,140 B2

PERSONALIZED MEDIA OVERLAY RECOMMENDATION

CROSS-REFERENCE TO RELATED APPLICATION

This application is a continuation of U.S. patent application Ser. No. 16/834,438, filed Mar. 30, 2020, which is incorporated by reference herein in its entirety.

BACKGROUND

As the popularity of mobile based social networking systems continues to grow, users increasingly share media content items, such as electronic images, animations, or videos with each other. These media content items are typically uniquely personalized, and thus, reflect a demand to encourage electronic visual communication on a global scale.

Social networking systems comprise millions of users. Each user in a social networking system can transmit media content items between members of his or her individual social networking profile or to individuals outside of the social networking profile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

When sending media content items between users, it is paramount that the social networking systems provide the ability to present to each user the media content items that are most interesting or relevant to them. The ability to modify and customize media content items during the generation stage of such items, improves interconnectivity and interactivity of the end user dramatically. In at least one embodiment of the present disclosure, a system is provided that improves on the functionality of recommending media overlay icons that are overlaid on top of media content items during generation of a content collection or ephemeral message content collection. The system accesses data entered into a descriptive text data interface (e.g. a caption field) during generation of a content collection and determines which words, phrases, numbers, or letters, are associated with stored media overlay icons.

Once the system finds a match of associated media overlay icons, a second media overlay icon interface is generated in order to display the media overlay icons that correspond to the analyzed words, phrases, numbers, or letters in descriptive text data interface. A user of the client device is able to select the desired media overlay icon and overlay it over the content collection or ephemeral message content collection prior to transmission.

Embodiments of the present disclosure improve the functionality of media overlay recommendation systems in electronic messaging and imaging software systems by accessing and determining, during generating of a content collection, which terms in a descriptive text interface are directly associated with media overlay icons and by minimizing the delay in executing an augmented overlay function using media icon overlay icons thereby simplifying and technologically enhancing the animation and content collection generation process.

Figure 1:
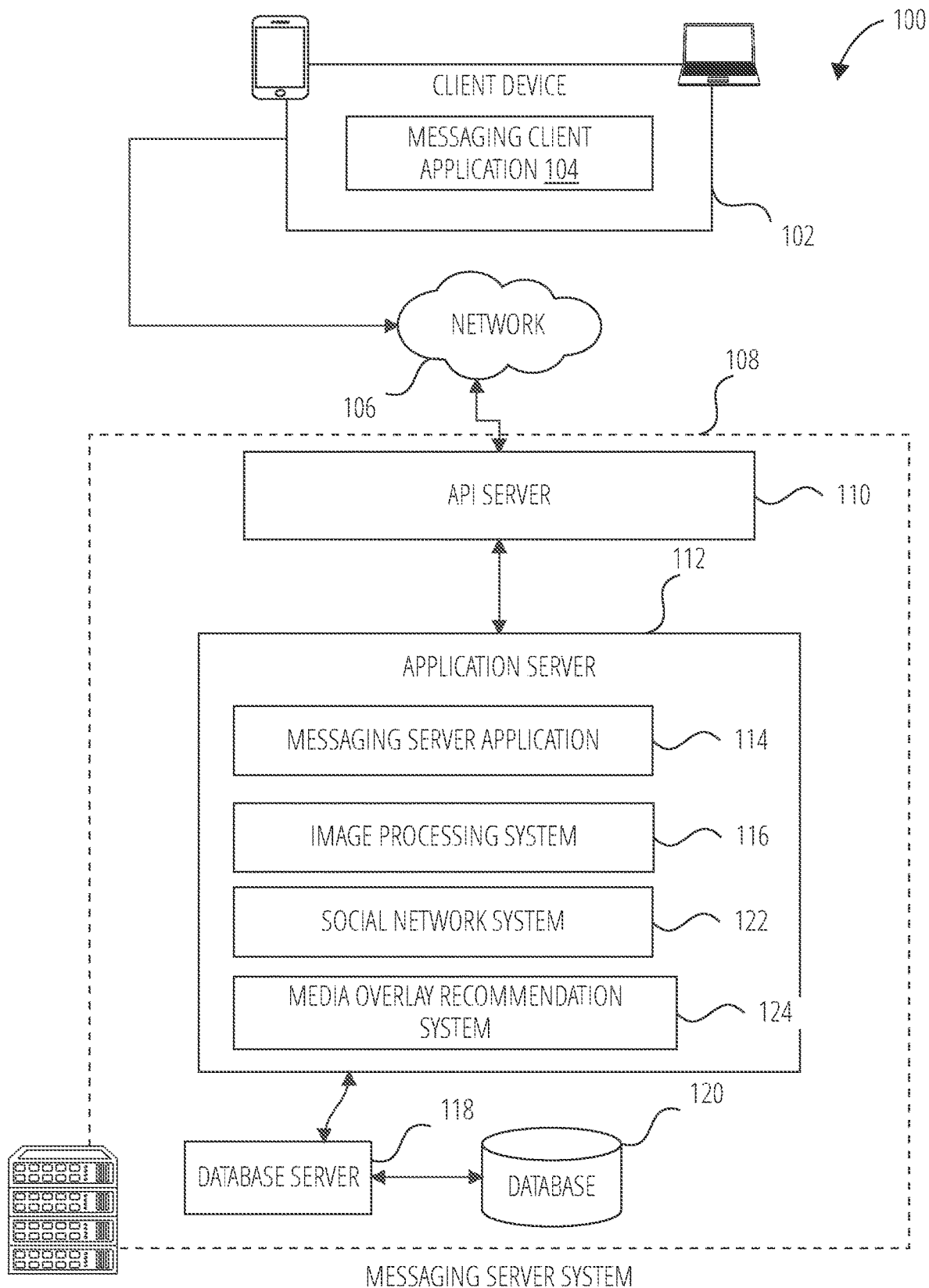
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a Client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a Client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, Client Device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., content collection), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, and a media overlay recommendation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called content collections or galleries). These collections are then made available, by the messaging server application 114, to the messaging client application 104. Other Processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
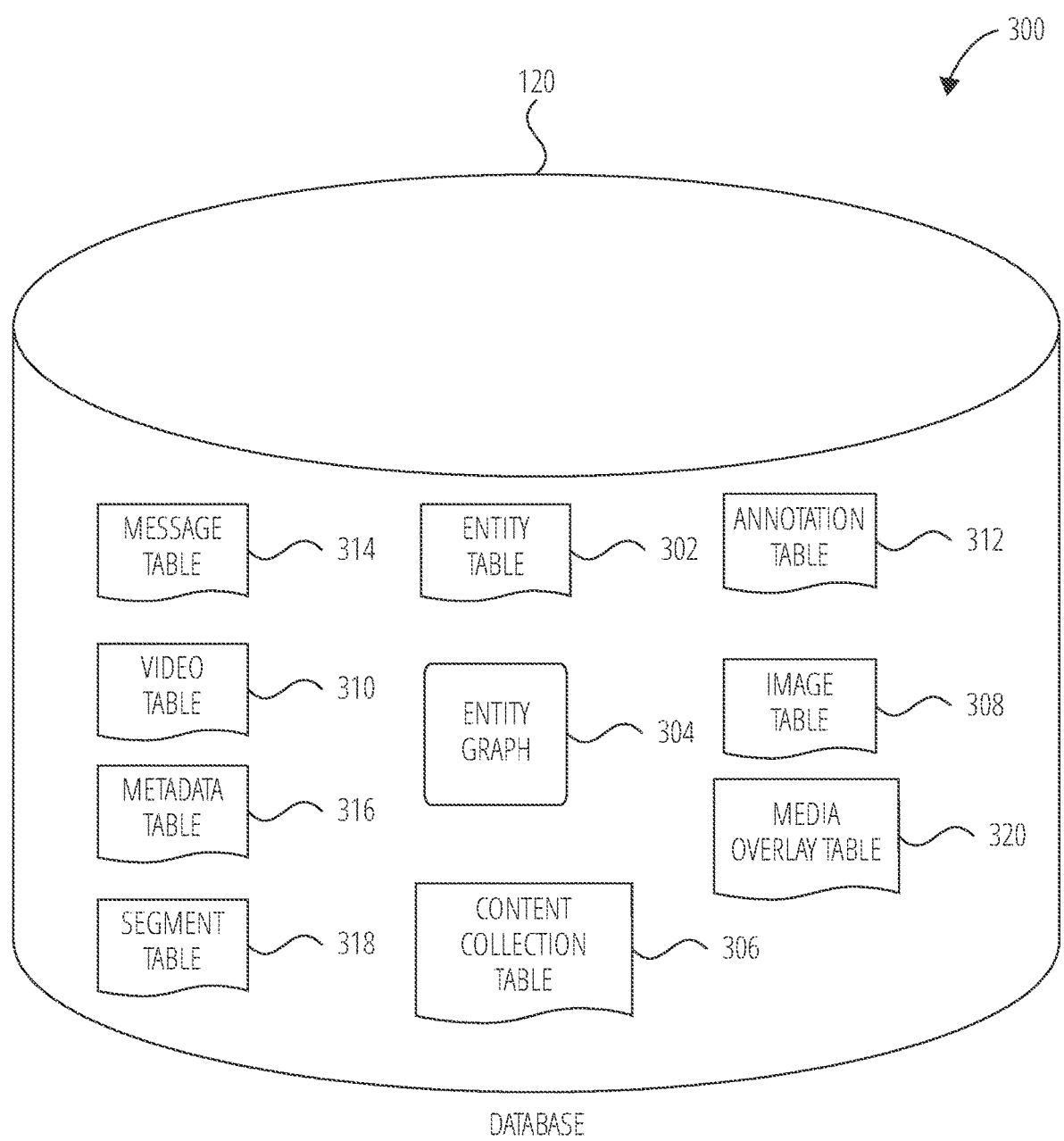
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

The media overlay recommendation system 124 is responsible for managing the recommendation process of media overlay icons that are rendered and overlaid on top of the media content items during generation of media content, content collection, or ephemeral content collections. The media overlay recommendation system 124 analyzes descriptive text data entered into a descriptive text data interface and associates all or portions of the descriptive text data with content characteristics associated with media overlay icons, as shown and explained further in FIG. 5 below.

Figure 2:
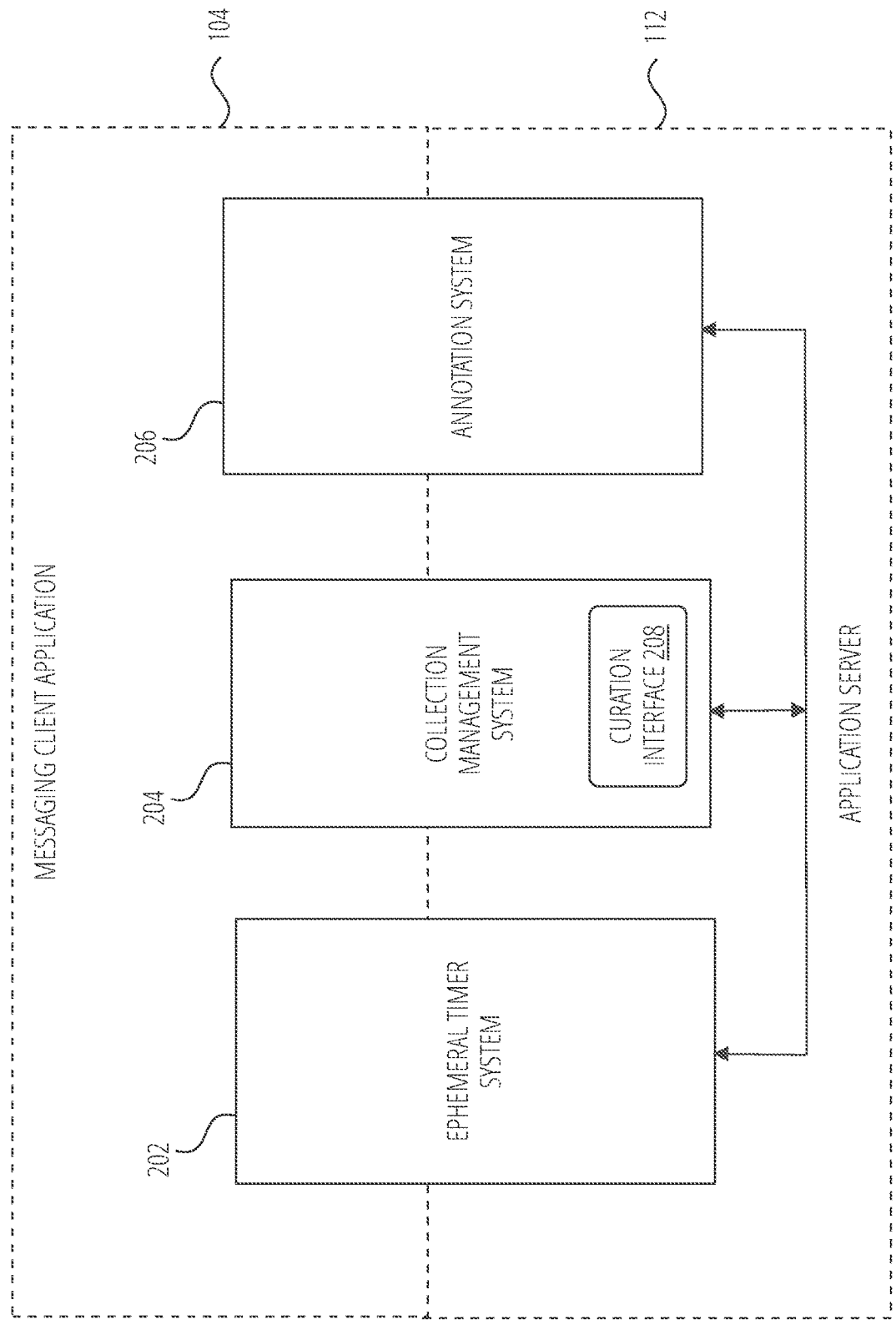
FIG. 2 is a diagrammatic representation of a messaging client application, in accordance with some example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a content collection), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event content collection." Such a collection may be made available for a specified time period, such as the duration of an event to which the content relates. For example, content relating to a music concert may be made available as a "content collection" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the Client device 102. In another example, the annotation system 206 operatively supplies a media overlay to the messaging client application 104 based on other information, such as social network information of the user of the Client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the Client device 102. For example, the media overlay may include text that can be overlaid on top of a photograph taken by the Client device 102. In another example, the media overlay includes an identification of a location overlay (e.g., Venice beach), a name of a live event, or a name of a merchant overlay (e.g., Beach Coffee House). In another example, the annotation system 206 uses the geolocation of the Client device 102 to identify a media overlay that includes the name of a merchant at the geolocation of the Client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the Client device 102. Another type of filer is a data filer, which may be selectively presented to a sending user by the messaging client application 104, based on other inputs or information gathered by the Client device 102 during the message creation process. Example of data filters include current temperature at a specific location, a current speed at which a sending user is traveling, battery life for a Client device 102, or the current time.

Other annotation data that may be stored within the image table 308 is graphic overlay data. Graphical overlay data may be a real-time special effect and sound that may be added to an image, or a video. This includes real-time modification which modifies an image as it is captured using a device sensor and then displayed on a screen of the device with the modifications. This also includes modifications to stored content, such as video clips in a gallery that may be modified.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A content collection table 306 stores data regarding collections of messages and associated image, video, or audio data, which are compiled into a collection (e.g., a content collection or a gallery). The creation of a particular collection may be initiated by a particular user (e.g., each user for which a record is maintained in the entity table 302). A user may create a "personal content collection" in the form of a collection of content that has been created and sent/broadcast by that user. To this end, the user interface of the messaging client application 104 may include an icon that is user-selectable to enable a sending user to add specific content to his or her personal content collection.

A collection may also constitute a "live content collection," which is a collection of content from multiple users that is created manually, automatically, or using a combination of manual and automatic techniques. For example, a "live content collection" may constitute a curated stream of user-submitted content from varies locations and events. Users whose client devices have location services enabled and are at a common location event at a particular time may, for example, be presented with an option, via a user interface of the messaging client application 104, to contribute content to a particular live content collection. The live content collection may be identified to the user by the messaging client application 104, based on his or her location. The end result is a "live content collection" told from a community perspective.

A further type of content collection is known as a "location content collection", which enables a user whose Client device 102 is located within a specific geographic location (e.g., on a college or university campus) to contribute to a particular collection. In some embodiments, a contribution to a location content collection may require a second degree of authentication to verify that the end user belongs to a specific organization or other entity (e.g., is a student on the university campus).

The database 120 also stores a metadata table 316, segment table 318, and a media overlay table 320. The metadata table 316 includes the metadata associated with the media content items, media overlay icons, three-dimensional (3D) animation graphics and objects, or two-dimensional (2D) images. The metadata can be associated with the animation, including 3D animation, that is created by a content creator and the media content identifier. The media content items and media overlay icons can include a plurality of media content segments and media overlay icon segments, which may also be referred to as media overlay icon characteristics, that include a user's avatar, media overlay icons, or other 3D images. The segment table 318 can store the media content segments (e.g. media overlay icon content characteristics). The media overlay table 320 can store the media content segments/media overlay icon characteristics associated with each of the media content segments and media overlay icons. For example, once a media overlay icon with the same or similar media content segment or media overlay characteristics corresponding to descriptive text data input by a user of the client device 102, the media overlay table 320 can provide the associated media overlay icon for transmission or delivery for augmented overlay on top of the media content.

Figure 4:
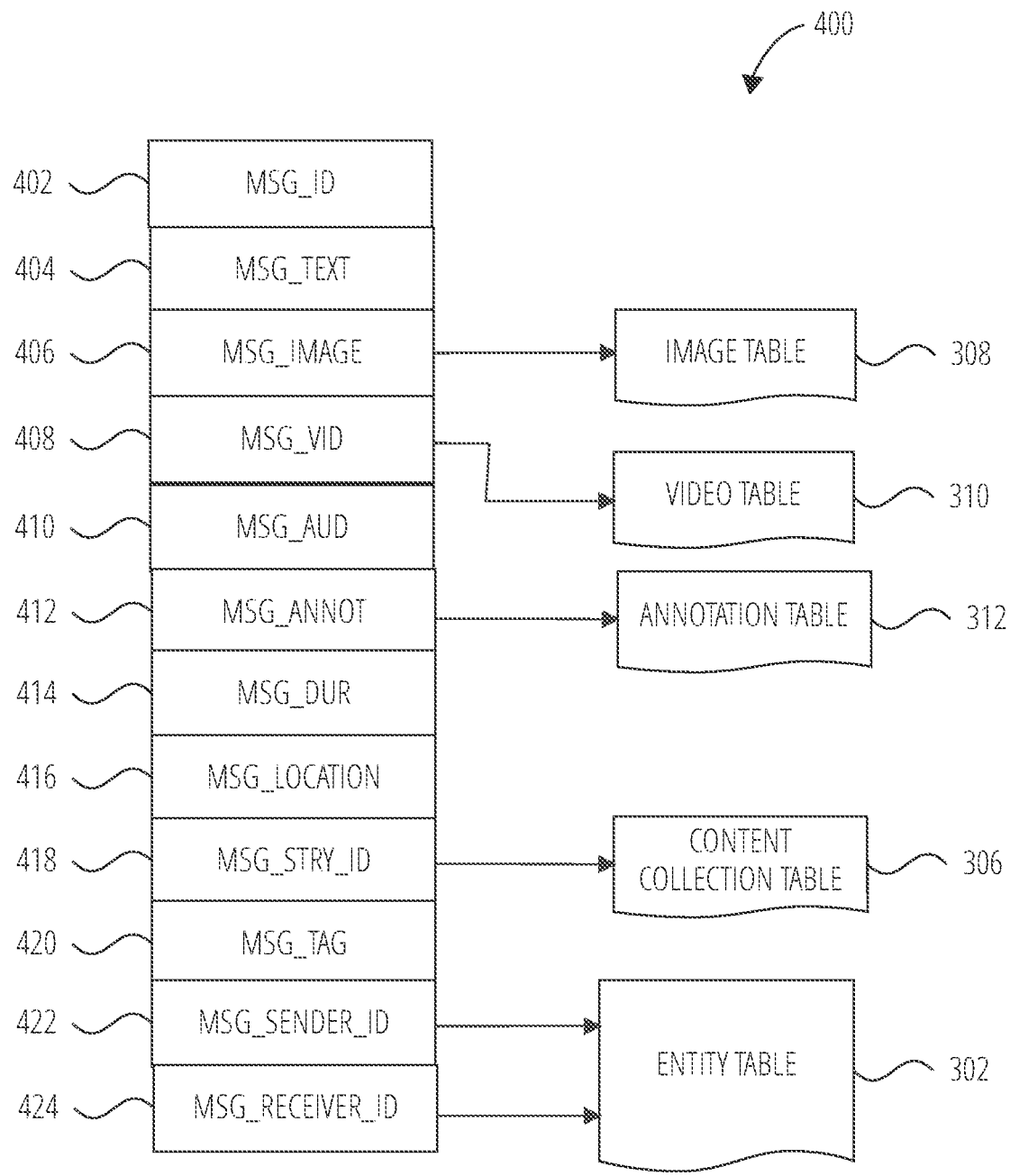
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the Client device 102 and that is included in the message 400.

A message image payload 406: image data, captured by a camera component of a Client device 102 or retrieved from a memory component of a Client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message content collection identifier 418: identifier values identifying one or more content collections (e.g., "content collections") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the Client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message content collection identifier 418 may point to data stored in a content collection table 306, and values stored within the message sender identifier 422 and the message receiver identifier 424 may point to user records stored within an entity table 302.

Figure 5:
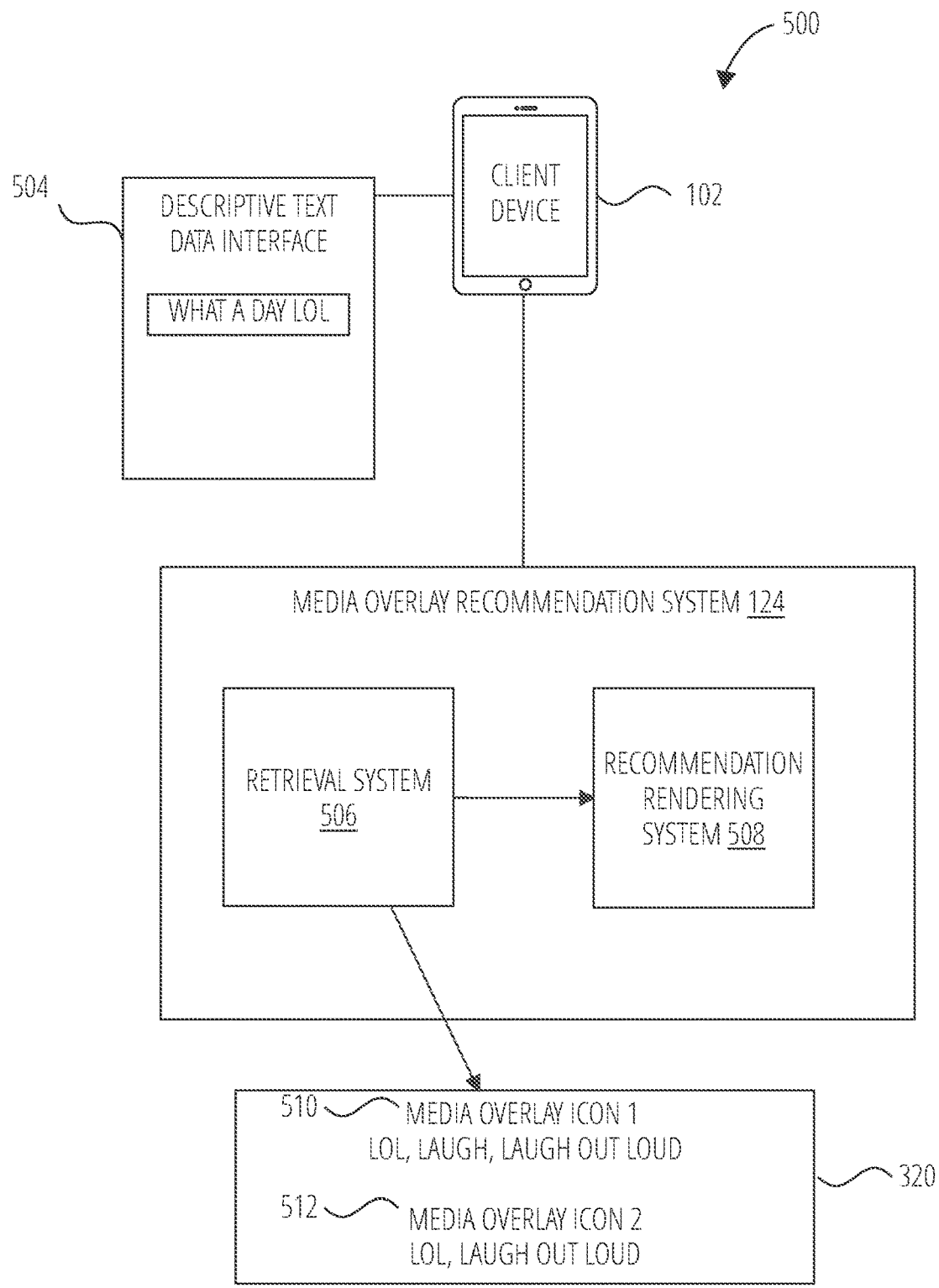
FIG. 5 illustrates a diagrammatic representation of the details of the media overlay recommendation system, in accordance with one embodiment.

FIG. 5 illustrates a diagrammatic representation of the details of the media overlay recommendation system 124 in accordance with one embodiment. Users of the social network system 122, which may also be referred to as content creators (e.g., animators) can upload or download new media item content periodically to the messaging server system 108 in FIG. 1. The content creators can upload or download the new media item content via an electronic computing device (e.g., client device 102) or new content can be uploaded by the messaging server system 108. The media item content can be in the form of video, images, pictures, or animation and may be used during or prior to the generation of a content collection, ephemeral content collection, or ephemeral message.

In one embodiment, the media overlay recommendation system 124 receives a string of descriptive text data from a descriptive text data interface 504 displayed on a display of the client device 102. The descriptive text data may be any combination of a single word, phrase, title, slogan, or sentence that describes any action, event, place, or object that the content creator desires to input. The descriptive text data interface 504 is an interface that permits a user or content creator to input a text string which includes letters, numbers, or special characters to be superimposed or overlaid on top of an ephemeral message, content collection, non-ephemeral message or ephemeral content collection. The client device 102 or media overlay recommendation system 124 analyzes the descriptive text data to determine which portion, whole or in part, of the descriptive text data matches, in whole or in part, with a media segment or media overlay characteristic in the media overlay table 320.

As shown in FIG. 5, the retrieval system 506 of the media overlay recommendation system 124 can retrieve (or fetch) the media overlay icons that match (in whole or in part) a data characteristic within the descriptive text data. For instance, the descriptive text data interface 504 includes descriptive text data "WHAT A DAY LOL". The retrieval system 506 analyzes each word individually and the sentence as a whole in order to determine a data characteristic, which in this example is "LOL". The retrieval system 506 communicates with the database 120 and media overlay table 320 in order to determine which media overlay icons comprise media overlay icon characteristics that match (in whole or in part) the data characteristic within the descriptive text data.

As shown, the media overlay icon 1 510 comprises media overlay icon characteristics "LOL, laugh, laugh out loud" and media overlay icon 2 512 comprises media overlay icon characteristics "lol" and "laugh-out-loud". These media overlay icon characteristics may also be stored as metadata within the metadata table 316. The recommendation rendering system determines that the media overlay icon characteristics of each of media overlay icon 1 510 and media overlay icon 2 512 match the data characteristic of the description text data (e.g., "LOL"). The recommendation rendering system 508 retrieves each of the media overlay icon 1 510 and the media overlay icon 512 and generates a media overlay icon interface at the client device 102 (explained in more detail below). The retrieval system 506 may also rank each media overlay icon in the media overlay icon interface according to a number or frequency of confirmed matches between the descriptive text data and associated media overlay characteristics.

Figure 6:
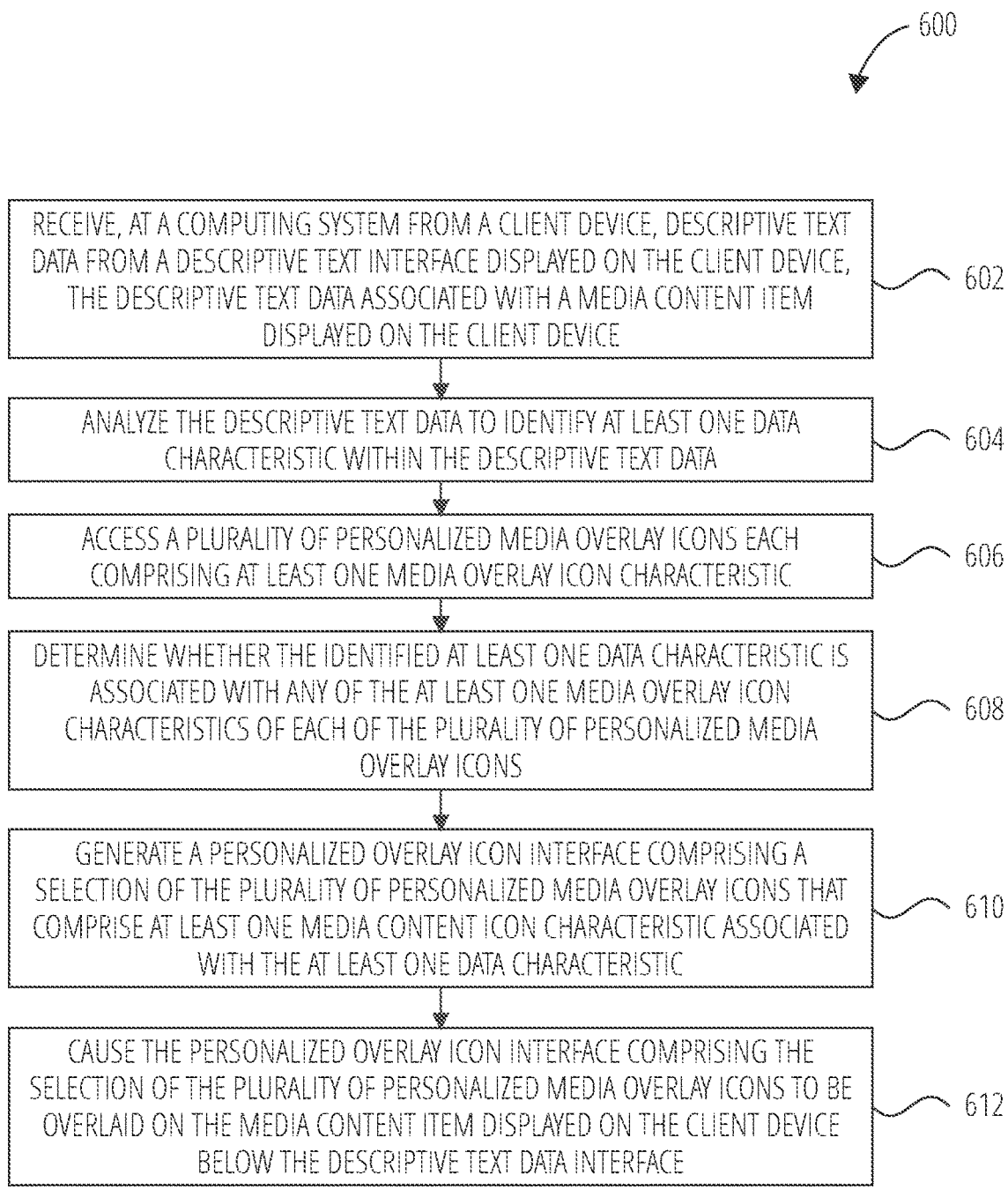
FIG. 6 illustrates a flowchart of a process for recommending personalized media overlay icons via descriptive text data, in accordance with one embodiment.

FIG. 6 illustrates a flowchart of a process for recommending personalized media overlay icons via descriptive text data in accordance with one embodiment. In operation 602, the computing system (media overlay recommendation system 124) receives descriptive text data from a descriptive text interface displayed on the client device, the descriptive text data associated with a media content item displayed on the client device. For example, a user of the client device inputs descriptive text data via a descriptive text interface 504 displayed on the client device. In one example, the descriptive text data is associated with a media content item displayed on the client device. As discussed previously, the descriptive text data includes any of a combination of a single word, phrase, title, slogan, or sentence that describes any action, event, place, or object that the user of the client device (e.g., a content creator) desires to input. The descriptive text data may also be referred to as caption data information and may be input into the descriptive text data interface 504 during generation of a message (including an ephemeral message 1002), content collection, or ephemeral content collection.

In operation 604, the computing system analyzes the descriptive text data to identify at least one data characteristic within the descriptive text data. In one example, the data characteristic includes a word, phrase, letter, or number, or any combination thereof, that may be mapped with metadata stored in the metadata table 316. In another example, the data characteristic may be a portion of a word, sentence, or phrase that have the same or similar characteristics to the media overlay icon characteristics associated with the stored media overlay icons.

In operation 606, the computing system accesses a plurality of personalized media overlay icons each comprising at least one media overlay icon characteristic. The media overlay icons are also referred to herein as personalized media overlay icons. In one example, the personalized media overlay icons are icons that include an avatar of the user or content creator or some other personalized image, digital effigy, 3D image, overlay, transformation, or animation.

In operation 608, the computing system determines whether the identified at least one data characteristic is associated with any of the at least one media overlay icon characteristics of each of the plurality of personalized media overlay icons. In one example, the personalized media overlay icons may include media overlay icon characteristic stored as metadata in the metadata table 316 or may include characteristic data attached or included within the structure of the media overlay icon. In one example, the retrieval system 506 may execute the operation 608. In response to determining that the at least one data characteristic of the descriptive text data is associated with a media overlay icon characteristic of a selection of personalized media overlay icons of the plurality of personalized media overlay icons, the computing system generates a personalized overlay icon interface comprising a selection of the plurality of personalized media overlay icons that comprise at least one media content icon characteristic associated with the at least one data characteristic as shown in operation 610. In one example, the selection of the plurality of personalized media overlay icons are arranged in the personalized media overlay icon interface.

In operation 612, the computing system causes the personalized overlay icon interface comprising the selection of the plurality of personalized media overlay icons to be overlaid on the media content item displayed on the client device below the descriptive text data interface. In one example, the personalized overlay icon interface may be overlaid during the generation of a message (including an ephemeral message 1002), a content collection, or an ephemeral content collection. In another example, the media overlay recommendation system 124 generates a second personalized overlay icon interface comprising a second selection of a plurality of personalized media overlay icons that are associated with the data characteristic. The computing system causes the second selection of the plurality of personalized media overlay icons to be displayed in the second media overlay icon interface in a ranked or prioritized order according to which media overlay icon comprises media overlay icon characteristics that are the most similar or directly match the data characteristic of the descriptive text data.

In one example, the client device detects a user gesture applied to a display of selected personalized media overlay icon within the second selection of the plurality of personalized media overlay icons. The user gesture may be any one of a combination of hand swipes, finger swipes, eye-gaze, arm or leg movements, voice command, or body movement implemented on the client device 102. A series of commands may be executed in response to the detected user gestures, which may include, deactivating the descriptive text interface, activating a keyboard interface, re-activating the media overlay icon interface, or expanding the media overlay icon interface.

Figure 7:
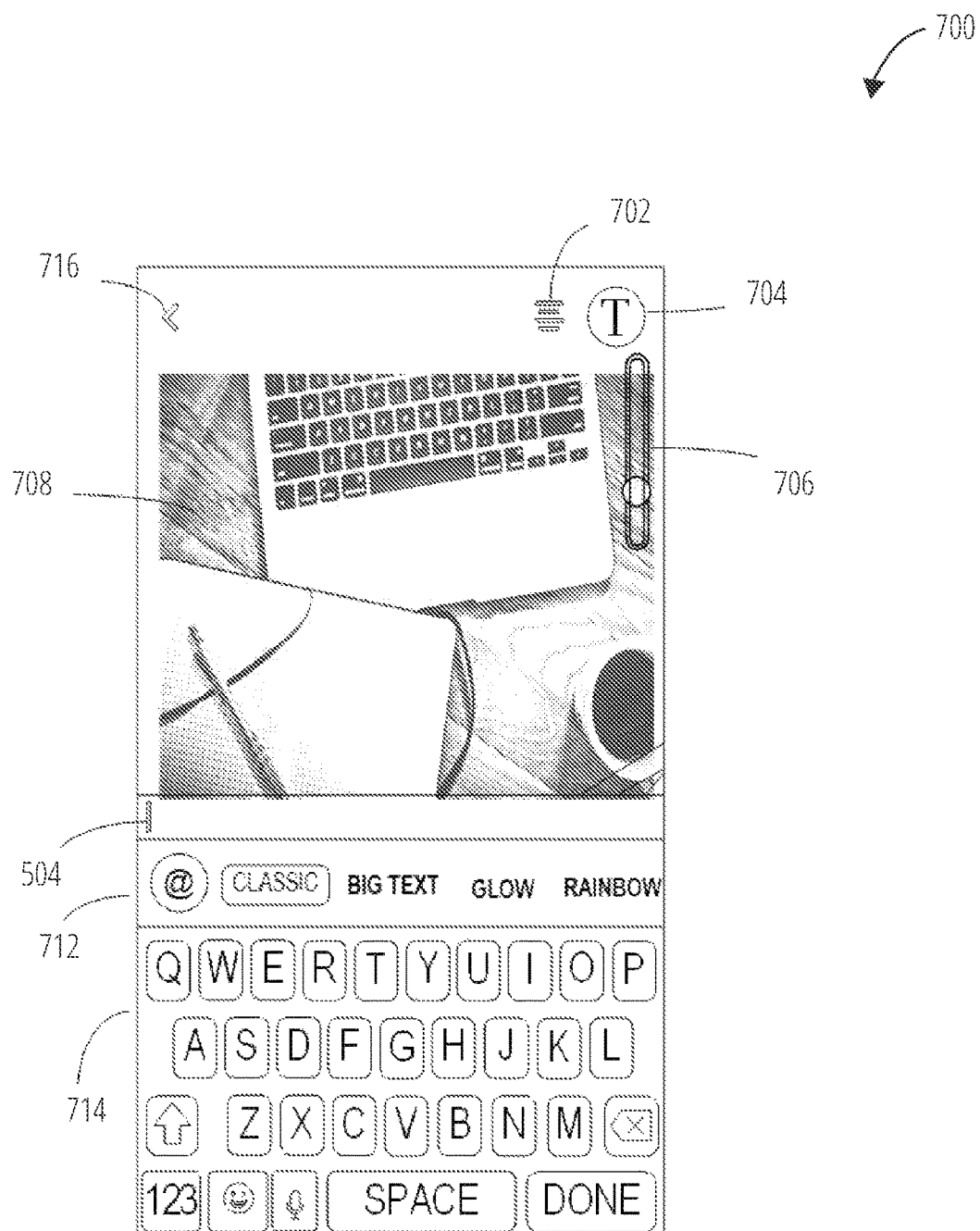
FIG. 7 illustrates an example of a user interface depicting a media content item being displayed by a client device, in accordance with one embodiment.

FIG. 7 illustrates an example of a user interface 700 of the client device. The user interface 700 depicts a media content item being displayed by a client device in accordance with one embodiment. The user interface 700 includes a back button 716, menu option 702, text editor 704, color indicator 706, keyboard interface 714, media overlay icon edit interface 712, descriptive text data interface 504, and the media content item 708. The media content item 708 may be any image, video, animation, content collection, ephemeral message, or ephemeral content collection, as explained above. For illustration purposes, the media content item 708 is part of an ephemeral content collection.

The menu option 702 may be activated and expose a plurality of menu options, including but not limited to, accessing a friend list, viewing content collection generation scores, viewing rewards, accessing settings, or the like. The text editor 704 includes options to modify, add, or remove text formatting. In one example, the text editor 704 permits the content creator to change the font size, style, or format for any text entered into the descriptive text data interface 504 or associated with media overlay icons. The color indicator 706 also permits the content creator to change or modify the color directed to any text entered into the descriptive text data interface 504 or associated with media overlay icons. The back button 716 displays a previous page or different page previously viewed in the media overlay recommendation system 124 user interface 700.

The user interface 700 also includes the descriptive text data interface 504 which, in one example, is a data field designed to receive user input in the form of an alpha-numeric character string. There may be a predetermined limit as to how many characters are permitted within the descriptive text data interface 504. The alpha-numeric character string may also be referred to as caption data that is overlaid or superimposed on top of the media content item, ephemeral message, or content collection. An additional media overlay icon edit interface 704 is also depicted which may be designed to include executable operations to modify or manipulate the descriptive text data input in the descriptive text data interface 504.

Figure 8:
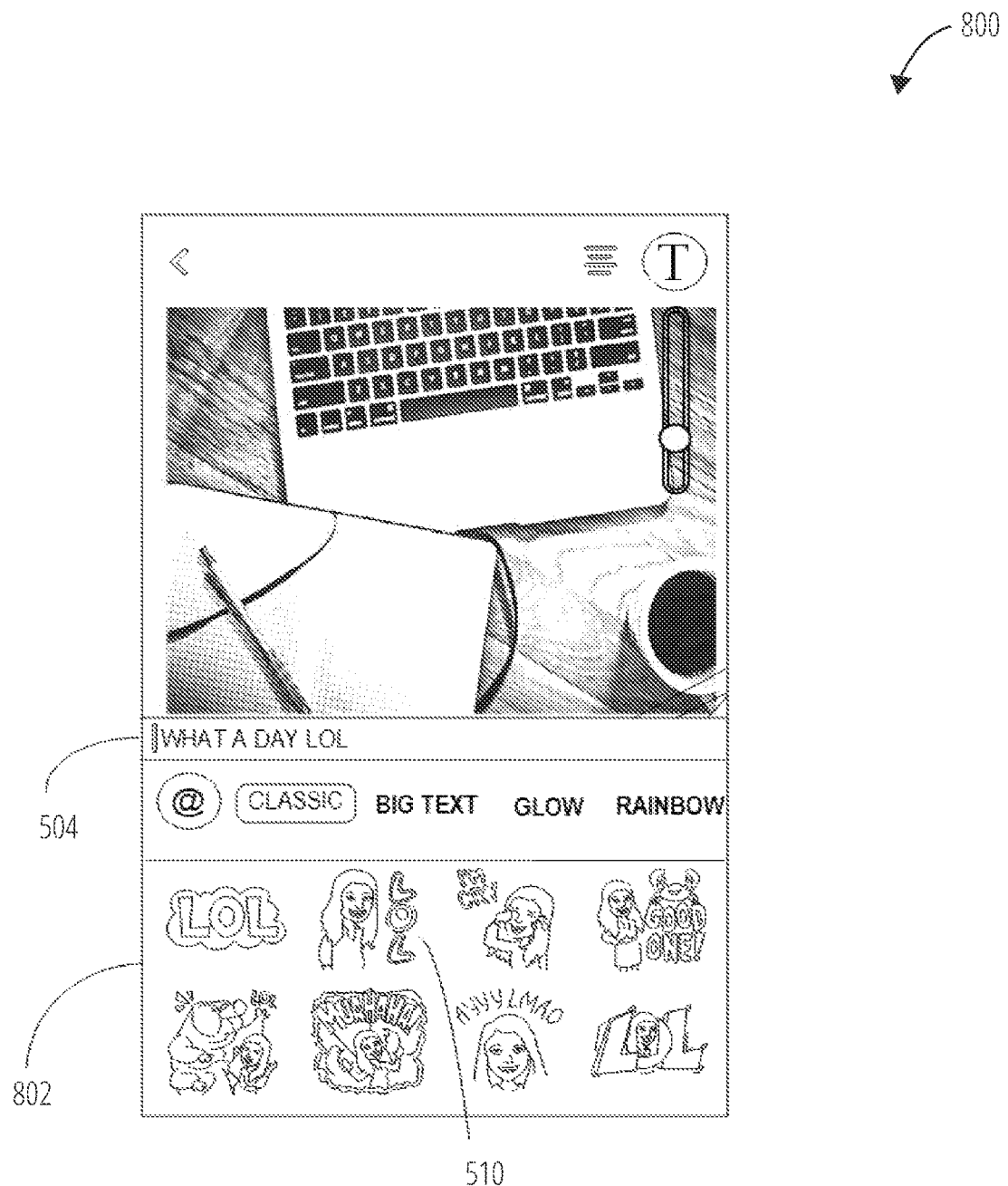
FIG. 8 illustrates an example of a user interface depicting at least a descriptive text interface and personalized media overlay icons being displayed by a client device, in accordance with one embodiment.

FIG. 8 illustrates an example of a user interface 800 depicting the descriptive text interface 504 and personalized media overlay icons (e.g., displayed in personalized overlay icon interface 802) being displayed by the client device in accordance with one embodiment. The descriptive text data interface 504 includes a string of characters shown as "What a day LOL". As described above, and in one example, the media overlay recommendation system 124 segments receives the string of characters from the client device and analyzes each component of the string of characters to segment the text into segments. For instance, the media overlay recommendation system 124 segments the string of characters shown in user interface 802 into "what", "a", "day", and "LOL". The media overlay recommendation system 124 determines whether each segment, individually or in combination with one or more other segments, matches any of the media overlay icon characteristics of any media overlay icons stored in the database 120.

FIG. 8 illustrates a personalized overlay icon interface 802 that is generated in response to determining matches between the descriptive text data and media overlay icon characteristics. The media overlay icon 510 corresponds to a personalized media overlay icon that includes a matching media overlay icon characteristic (e.g. "LOL"). Also, the media overlay icon 510 includes an avatar directly associated with the content creator using the client device 102 (e.g., an avatar that resembles the content creator). The personalized overlay icon interface 802 also includes additional media overlay icons that have matching or similar media overlay icon characteristics as the data characteristic of the descriptive data input into the descriptive text data interface 504.

In one example, when the descriptive text data is entered into the descriptive text data interface 504, the media overlay icon interface 802 is generated in real time (or near real time) and appears instantly in the user interface 800 of the client device 102. Upon detecting a user gesture, the client device can activate or deactivate the keyboard interface 714 or the media overlay icon interface 802.

Figure 9:
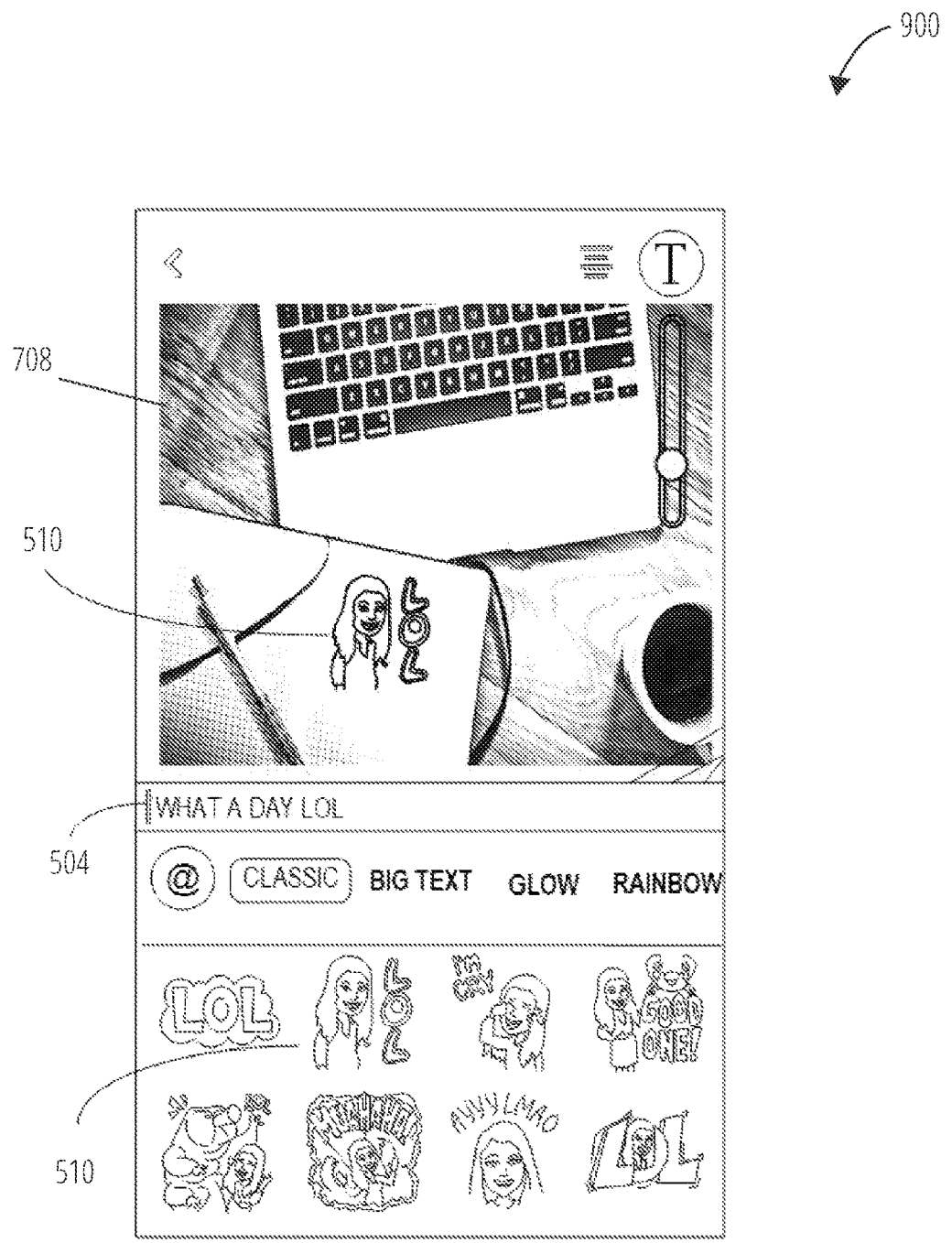
FIG. 9 illustrates an example of a user interface depicting at least a personalized media overlay icon overlaid on top of the media content item being displayed by a client device, in accordance with one embodiment.

FIG. 9 illustrates an example of a user interface 900 depicting a descriptive text data interface 504 and a personalized media overlay icon 510 being overlaid on top of a media content item 708 on a display of the client device in accordance with one embodiment. As shown, the descriptive text data interface 504 includes the string of characters disclosed as "What a day LOL". As explained above, the media overlay recommendation system 124 determined that the "LOL" data characteristic of the descriptive text data string matches a media overlay icon characteristic of personalized media overlay icon 510. The personalized media overlay 510 is selectable by the content creator and can be overlaid on top of the media content item 708 during generation of the media item content. As explained above, the media content item may include an ephemeral message, content collection, or ephemeral content collection. In at least one example, the selected personalized media overlay icon 510 is overlaid on top of the media content item and a copy of the selected personalized media overlay icon 510 remains in the media overlay icon interface 802.

Figure 10:
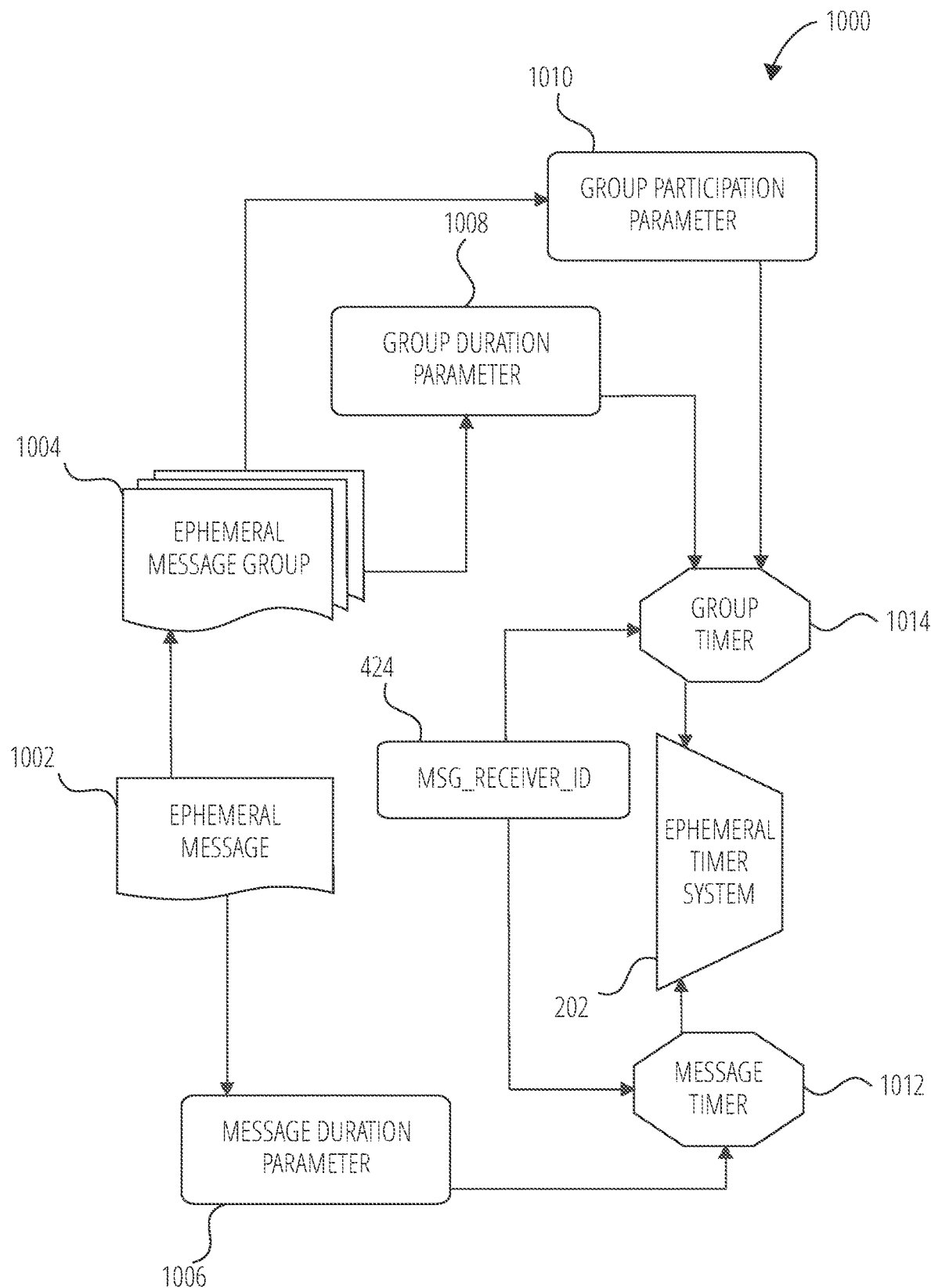
FIG. 10 is a schematic block diagram illustrating an example access-limiting process, in terms of which access to content (e.g., an ephemeral message, and associated multimedia and media content payload of data) or a content collection (e.g., an ephemeral message content collection) may be time-limited (e.g., made ephemeral), in accordance with some embodiments of the present disclosure.

FIG. 10 is a schematic diagram illustrating an access-limiting process 1000, in terms of which access to content (e.g., an ephemeral message 1002, and associated multimedia payload of data) or a content collection (e.g., an ephemeral message group 1004) may be time-limited (e.g., made ephemeral).

An ephemeral message 1002 is shown to be associated with a message duration parameter 1006, the value of which determines an amount of time that the ephemeral message 1002 will be displayed to a receiving user of the ephemeral message 1002 by the messaging client application 104. In one embodiment, an ephemeral message 1002 is viewable by a receiving user for up to a maximum of 10 seconds, depending on the amount of time that the sending user specifies using the message duration parameter 1006.

The message duration parameter 1006 and the message receiver identifier 424 are shown to be inputs to a message timer 1012, which is responsible for determining the amount of time that the Ephemeral message 1002 is shown to a particular receiving user identified by the message receiver identifier 424. In particular, the ephemeral message 1002 will only be shown to the relevant receiving user for a time period determined by the value of the message duration parameter 1006. The message timer 1012 is shown to provide output to a more generalized ephemeral timer system 202, which is responsible for the overall timing of display of content (e.g., an ephemeral message 1002) to a receiving user.

The ephemeral message 10022 is shown in FIG. 10 to be included within an ephemeral message group 1004 (e.g., a collection of messages in a personal content collection, or an event content collection). The ephemeral message group 1004 has an associated group duration parameter 1008, a value of which determines a time-duration for which the ephemeral message group 1004 is presented and accessible to users of the messaging system 100. The group duration parameter 1008, for example, may be the duration of a music concert, where the ephemeral message group 1004 is a collection of content pertaining to that concert. Alternatively, a user (either the owning user or a curator user) may specify the value for the group duration parameter 1008 when performing the setup and creation of the ephemeral message group 1004.

Additionally, each ephemeral message 1002 within the ephemeral message group 1004 has an associated group participation parameter 1010, a value of which determines the duration of time for which the ephemeral message 1002 will be accessible within the context of the ephemeral message group 1004. Accordingly, a particular ephemeral message group 1004 may "expire" and become inaccessible within the context of the ephemeral message group 1004, prior to the ephemeral message group 1004 itself expiring in terms of the group duration parameter 1008. The group duration parameter 1008, group participation parameter 1010, and message receiver identifier 424 each provide input to a group timer 1014, which operationally determines, firstly, whether a particular ephemeral message 1002 of the ephemeral message group 1004 will be displayed to a particular receiving user and, if so, for how long. Note that the ephemeral message group 1004 is also aware of the identity of the particular receiving user as a result of the message receiver identifier 424.

Accordingly, the group timer 1014 operationally controls the overall lifespan of an associated ephemeral message group 1004, as well as an individual ephemeral message 1002 included in the ephemeral message group 1004. In one embodiment, each and every ephemeral message 1002 within the ephemeral message group 1004 remains viewable and accessible for a time-period specified by the group duration parameter 1008. In a further embodiment, a certain ephemeral message 1002 may expire, within the context of ephemeral message group 1004, based on a group participation parameter 1010. Note that a message duration parameter 1006 may still determine the duration of time for which a particular ephemeral message 1002 is displayed to a receiving user, even within the context of the ephemeral message group 1004. Accordingly, the message duration parameter 1006 determines the duration of time that a particular ephemeral message 1002 is displayed to a receiving user, regardless of whether the receiving user is viewing that ephemeral message 1002 inside or outside the context of an ephemeral message group 1004.

The ephemeral timer system 202 may furthermore operationally remove a particular ephemeral message 1002 from the ephemeral message group 1004 based on a determination that it has exceeded an associated group participation parameter 1010. For example, when a sending user has established a group participation parameter 1010 of 24 hours from posting, the ephemeral timer system 202 will remove the relevant ephemeral message 1002 from the ephemeral message group 1004 after the specified 24 hours. The ephemeral timer system 202 also operates to remove an ephemeral message group 1004 either when the group participation parameter 1010 for each and every ephemeral message 1002 within the ephemeral message group 1004 has expired, or when the ephemeral message group 1004 itself has expired in terms of the group duration parameter 1008.

In certain use cases, a creator of a particular ephemeral message group 1004 may specify an indefinite group duration parameter 1008. In this case, the expiration of the group participation parameter 1010 for the last remaining ephemeral message 1002 within the ephemeral message group 1004 will determine when the ephemeral message group 1004 itself expires. In this case, a new ephemeral message 1002, added to the ephemeral message group 1004, with a new group participation parameter 1010, effectively extends the life of an ephemeral message group 1004 to equal the value of the group participation parameter 1010.

Responsive to the ephemeral timer system 202 determining that an ephemeral message group 1004 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 1004 to no longer be displayed within a user interface of the messaging client application 104. Similarly, when the ephemeral timer system 202 determines that the message duration parameter 1006 for a particular ephemeral message 1002 has expired, the ephemeral timer system 202 causes the messaging client application 104 to no longer display an indicium (e.g., an icon or textual identification) associated with the ephemeral message 1002.

Figure 11:
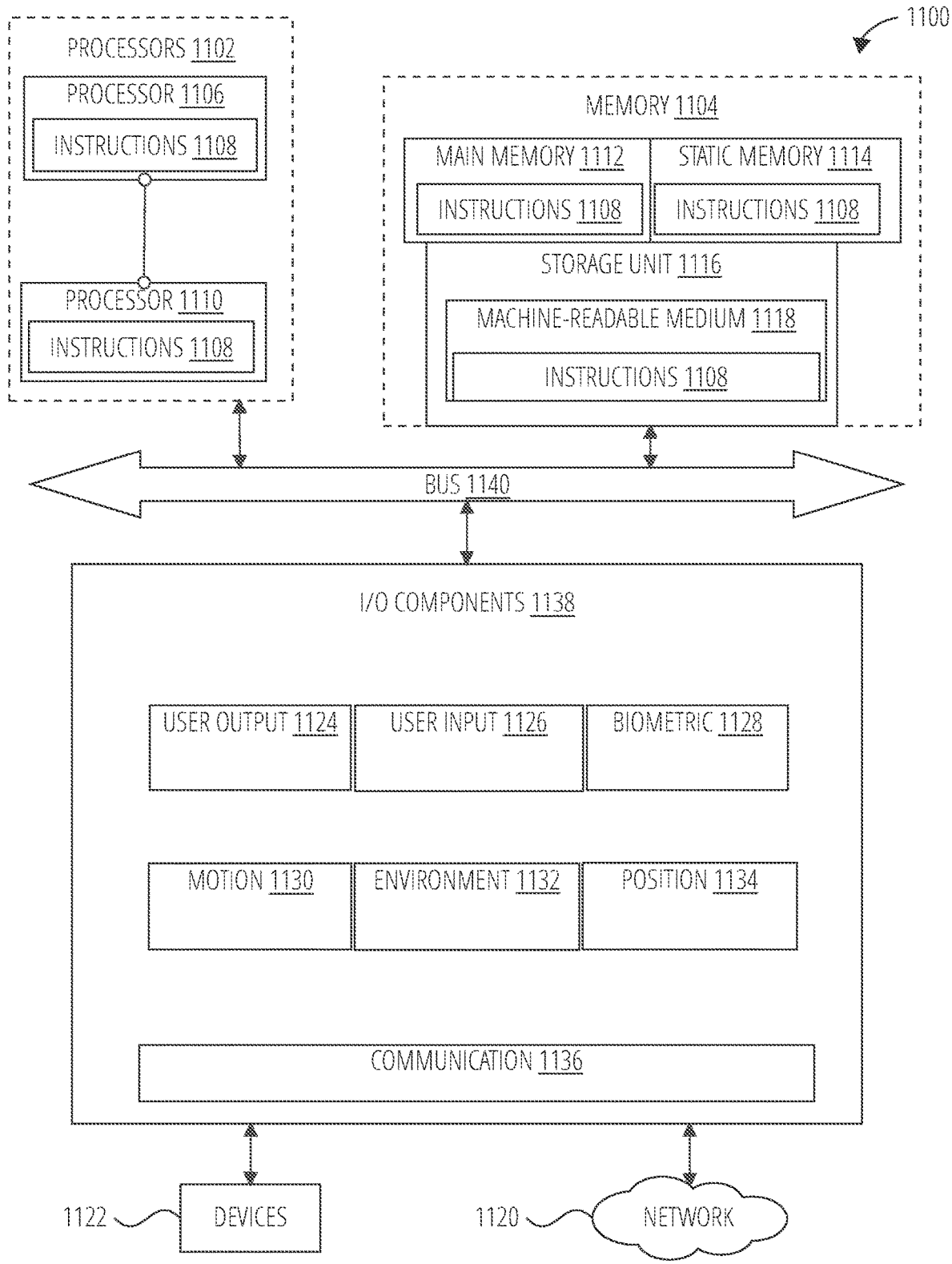
FIG. 11 is a diagrammatic representation of a machine in the form of a computer system within which a set of instructions may be executed for causing the machine to perform any one or more of the methodologies discussed herein, in accordance with some example embodiments.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1138, which may be configured to communicate with each other via a bus 1140. In an example embodiment, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core processors that may comprise two or more independent processors (sometimes referred to as "cores") that may execute instructions contemporaneously. Although FIG. 11 shows multiple processors 1102, the machine 1100 may include a single Processor with a single core, a single Processor with multiple cores (e.g., a multi-core Processor), multiple processors with a single core, multiple processors with multiples cores, or any combination thereof.

The memory 1104 includes a main memory 1112, a static memory 1114, and a storage unit 1116, both accessible to the processors 1102 via the bus 1140. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the Processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various example embodiments, the I/O components 1138 may include user output components 1124 and user input components 1126. The user output components 1124 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location or force of touches or touch gestures, or other tactile input components), audio input components (e.g., a microphone), and the like.

In further example embodiments, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope). The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1134 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface Component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, or memory of the processors 1102) or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed embodiments.

The instructions 1108 may be transmitted or received over the network 1120, using a transmission medium, via a network interface device (e.g., a network interface Component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Figure 12:
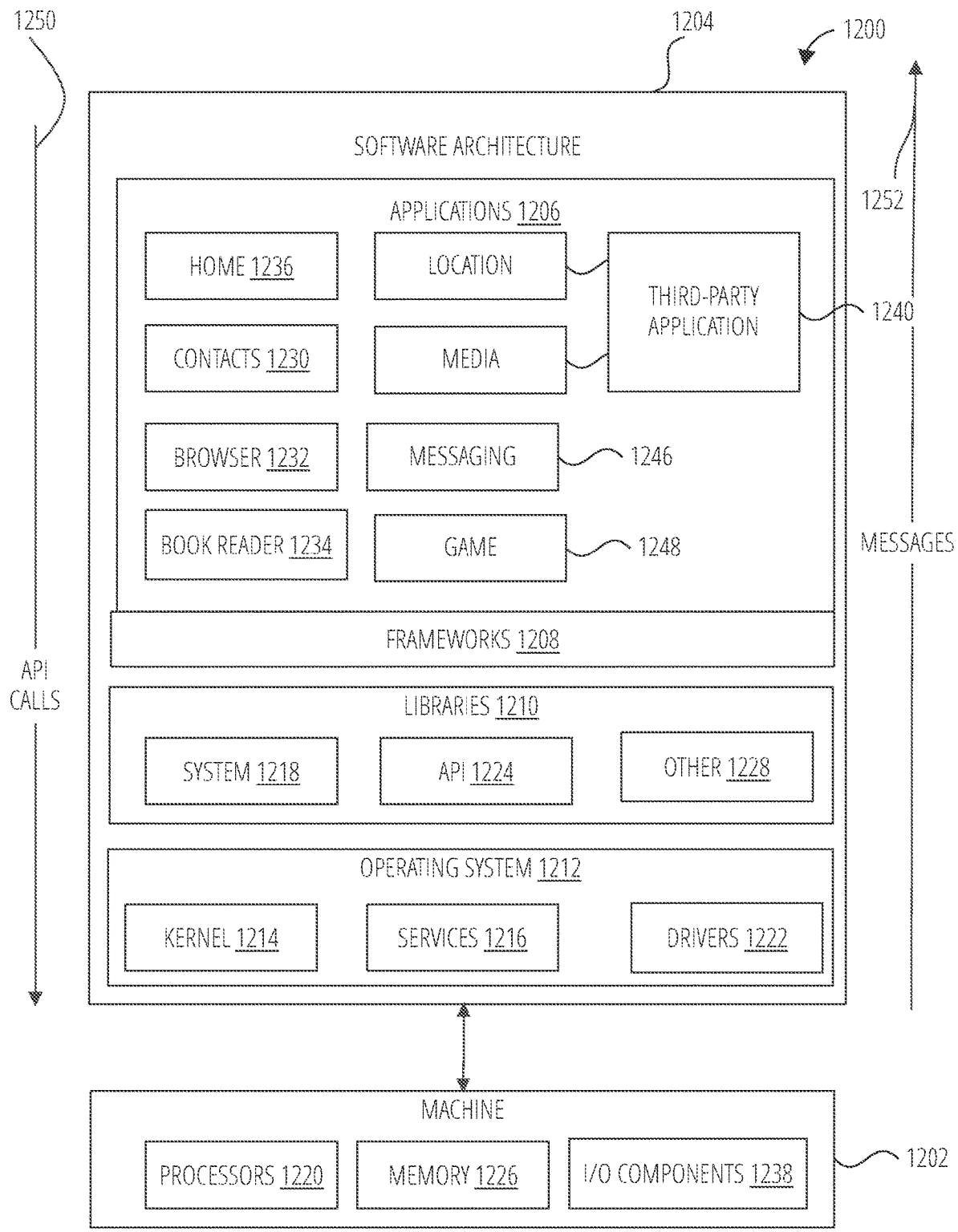
FIG. 12 is block diagram showing a software architecture within which the present disclosure may be implemented, according to an example embodiment.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, Processor management (e.g., scheduling), Component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The e applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

What is claimed is:

1. A method comprising:
receiving, at a computing system from a client device of a user, descriptive text data from a descriptive text interface displayed on the client device, the descriptive text data associated with a media content item displayed on the client device;
analyzing the descriptive text data to identify a data characteristic within the descriptive text data;
accessing a plurality of personalized media overlay icons each comprising one or more media overlay icon characteristics;
determining that the identified data characteristic is associated with a media overlay icon characteristic associated with a subset of the plurality of personalized media overlay icons, at least one personalized media overlay icon within the subset of the plurality of personalized media overlay icons depicting a personalized avatar of the user together with text corresponding to the data characteristic;
generating a personalized overlay icon interface comprising the subset of the plurality of personalized media overlay icons; and
causing the personalized overlay icon interface comprising the subset of the plurality of personalized media overlay icons to be displayed on the client device below the descriptive text interface.

2. The method of claim 1, wherein the media content item comprises a photo or a video captured by a device camera.

3. The method of claim 1, wherein the descriptive text data comprises an alpha-numeric string of characters that describe the media content item for overlaying on the media content item.

4. The method of claim 1, wherein the data characteristic comprises a sub-combination of letters, words, numbers, or special characters associated with the descriptive text data.

5. The method of claim 1, wherein the media overlay icon characteristic comprises a combination of letters, words, numbers, or special characters that are associated within each of the plurality of personalized media overlay icons.

6. The method of claim 1, wherein the personalized overlay icon interface is a first personalized overlay icon interface comprising a first selection of a plurality of personalized media overlay icons, and the method further comprises:
generating a second personalized overlay icon interface comprising a second selection of a plurality of personalized media overlay icons that are associated with the data characteristic;
detecting a user gesture applied to a selected personalized media overlay icon within the second selection of the plurality of personalized media overlay icons; and
deactivating the descriptive text interface in response to the detected user gesture.

7. The method of claim 6, wherein each of the plurality of personalized media overlay icons comprise a static image or an animation.

8. The method of claim 1, further comprising:
receiving second user input to send an ephemeral message comprising the media content item to a second client device, the ephemeral message having a predefined duration for display or access associated therewith;
generating, in response to receiving the second user input, the ephemeral message at the client device; and
causing the ephemeral message to be sent from the client device to the second client device.

9. The method of claim 1, wherein the descriptive text interface and the personalized overlay icon interface are included within a user interface for generating the media content item, the method further comprising:
causing display of a first interface element within the user interface, the first interface element being user-selectable to modify a font size, style, or format the text depicted in the at least one personalized media overlay icon; and
causing display of a second interface element within the user interface, the second user interface being user-selectable to modify a color of the text depicted in the at least one personalized media overlay icon.

10. A server system, comprising:
a processor; and
a memory storing instructions that, when executed by the processor, configure the server system to perform operations comprising:
receiving, at a computing system from a client device of a user, descriptive text data from a descriptive text interface displayed on the client device, the descriptive text data associated with a media content item displayed on the client device;
analyzing the descriptive text data to identify a data characteristic within the descriptive text data;
accessing a plurality of personalized media overlay icons each comprising one or more media overlay icon characteristics;
determining that the identified data characteristic is associated with a media overlay icon characteristic associated with a subset of the plurality of personalized media overlay icons, at least one personalized media overlay icon within the subset of the plurality of personalized media overlay icons depicting a personalized avatar of the user together with text corresponding to the data characteristic;
generating a personalized overlay icon interface comprising the subset of the plurality of personalized media overlay icons; and
causing the personalized overlay icon interface comprising the subset of the plurality of personalized media overlay icons to be displayed on the client device below the descriptive text interface.

11. The server system of claim 10, wherein the media content item comprises a photo or a video captured by a device camera.

12. The server system of claim 10, wherein the descriptive text data comprises an alpha-numeric string of characters that describe the media content item for overlaying on the media content item.

13. The server system of claim 10, wherein the data characteristic comprises a sub-combination of letters, words, numbers, or special characters associated with the descriptive text data.

14. The server system of claim 10, wherein the media overlay icon characteristic comprises a combination of letters, words, numbers, or special characters that are associated within each of the plurality of personalized media overlay icons.

15. The server system of claim 10, wherein the personalized overlay icon interface is a first personalized overlay icon interface comprising a first selection of a plurality of personalized media overlay icons, and the operations further comprise:

generating a second personalized overlay icon interface comprising a second selection of a plurality of personalized media overlay icons that are associated with the data characteristic;

detecting a user gesture applied to a selected personalized media overlay icon within the second selection of the plurality of personalized media overlay icons; and deactivating the descriptive text interface in response to the detected user gesture.

16. The server system of claim 10, wherein the operations further comprise:

receiving second user input to send an ephemeral message comprising the media content item to a second client device, the ephemeral message having a predefined duration for display or access associated therewith;

generating, in response to receiving the second user input, the ephemeral message at the client device; and causing the ephemeral message to be sent from the client device to the second client device.

17. The server system of claim 16, wherein each of the plurality of personalized media overlay icons comprise a static image or an animation.

18. A non-transitory computer-readable storage medium, the computer-readable storage medium including instructions that when executed by a computer, cause the computer to perform operations comprising:

receiving, at a computing system from a client device of a user, descriptive text data from a descriptive text interface displayed on the client device, the descriptive text data associated with a media content item displayed on the client device;

analyzing the descriptive text data to identify a data characteristic within the descriptive text data;

accessing a plurality of personalized media overlay icons each comprising one or more media overlay icon characteristics;

determining that the identified data characteristic is associated with a media overlay icon characteristic associated with a subset of the plurality of personalized media overlay icons, at least one personalized media overlay icon within the subset of the plurality of personalized media overlay icons depicting a personalized avatar of the user together with text corresponding to the data characteristic;

generating a personalized overlay icon interface comprising the subset of the plurality of personalized media overlay icons; and causing the personalized overlay icon interface comprising the subset of the plurality of personalized media overlay icons to be displayed on the client device below the descriptive text interface.

19. The non-transitory computer-readable storage medium of claim 18, wherein the personalized overlay icon interface is a first personalized overlay icon interface comprising a first selection of a plurality of personalized media overlay icons, and the instructions, when executed by the computer further cause the computer to perform the operations comprising:

generating a second personalized overlay icon interface comprising a second selection of a plurality of personalized media overlay icons that are associated with the data characteristic;

detecting a user gesture applied to a selected personalized media overlay icon within the second selection of the plurality of personalized media overlay icons; and deactivating the descriptive text interface in response to the detected user gesture.

20. The non-transitory computer-readable storage medium of claim 18, wherein the plurality of personalized media overlay icons comprises a static image or an animation, and wherein the media content item comprises a photo or a video captured by a device camera.

* * * * *